United States Patent

McIlvaine

[15] 3,668,825

[45] June 13, 1972

[54] METHOD AND APPARATUS FOR DETERMINING THE DIFFICULTY OF REMOVING POLLUTANTS BY WET SCRUBBING ACTION

[72] Inventor: Robert W. McIlvaine, Northbrook, Ill.

[73] Assignee: National Dust Collector Corporation, Skokie, Ill.

[22] Filed: Aug. 28, 1969

[21] Appl. No.: 853,767

[52] U.S. Cl...........................................55/21, 55/93, 55/223, 55/229, 55/233, 55/237, 55/258, 55/260, 55/270, 55/274, 55/316, 55/345, 55/357, 55/410, 55/459, 73/28, 73/421.5 R, 73/432 PS, 261/94, 261/116

[51] Int. Cl.......................................B01d 47/00, B01d 45/12

[58] Field of Search......................55/270, 21, 257, 235, 238, 55/315, 233, 459, 93, 223, 229, 258, 260, 274, 316, 345, 357, 410; 73/23, 28, 421.5 R, 421.5 A, 432 PS; 261/94, 116

[56] References Cited

UNITED STATES PATENTS

| | | | |
|---|---|---|---|
| 1,785,592 | 12/1930 | Nolze | 55/227 X |
| 2,489,893 | 11/1949 | Johnson | 261/DIG. 54 |
| 2,667,942 | 2/1954 | Wintermute | 55/127 |
| 2,768,705 | 10/1956 | Isserlis | 55/238 X |
| 2,930,237 | 3/1960 | Fowle, Jr. et al. | 73/421.5 A |
| 3,172,725 | 3/1965 | Rugh | 23/175 |
| 3,199,267 | 8/1965 | Hausberg | 55/235 X |
| 3,284,064 | 11/1966 | Kolm et al. | 55/238 X |
| 3,334,470 | 8/1967 | Huppke | 55/90 |
| 3,349,546 | 10/1967 | Rogers | 55/227 |
| 3,438,179 | 4/1969 | Jouault | 55/270 X |

OTHER PUBLICATIONS

Brink, Jr. et al., " Efficient Dust Control Via New Sampling Technique," Chemical Engineering, March 10, 1969, pages 106–110.

Primary Examiner—Dennis E. Talbert, Jr.
Attorney—Mason, Kolehmainen, Rathburn & Wyss

[57] ABSTRACT

A method of determining the difficulty of removing pollutants from gas including the steps of passing a sample of the gas through a wet scrubber stage for removing some of the pollutants therefrom, measuring the amount of pollutants remaining in said gas sample after passage through the wet scrubber stage, and adjusting the pressure drop across the scrubber stage to obtain the desired level of pollutants remaining after passage therethrough.

20 Claims, 4 Drawing Figures

PATENTED JUN 13 1972 3,668,825

INVENTOR:
ROBERT W. McILVAINE
BY
Mason, Kolehmainey, Rathbury & Wyss
ATT'YS 3,668,825

METHOD AND APPARATUS FOR DETERMINING THE DIFFICULTY OF REMOVING POLLUTANTS BY WET SCRUBBING ACTION

The present invention is directed towards a new and improved method of determining the difficulty of removing pollutants from gas and, more particularly, is directed towards a method of determining an index which is directly responsive to the difficulty of removing pollutants from gas by wet scrubbing action. An index thus developed will enable purchasers and vendors of pollution control equipment to use proper judgment in selecting equipment suitable for handling a particular pollution problem and insuring that the pollution is adequately controlled down to a level at or below the existing code requirements.

With the introduction of variable pressure drop, wet scrubbing equipment, such as that shown in U.S. Pat. application Ser. No. 816,922, filed Apr. 17, 1969, now U.S. Pat. No. 3,544,087, dated Dec. 1, 1970 and assigned to the same assignee as the present invention, a new dimension of choice in the selection of pollutant control equipment was added. Before the development of such variable pressure drop wet scrubbers, the design and selection of pollution control equipment were fairly simple and clear-cut. If the pollutant to be removed was a very fine dust, such as that emitted from an electric furnace, it was generally assumed that the only equipment suitable would be an extremely high efficiency collector, such as an electronic precipitator or a fabric filter. However, when variable pressure drop wet scrubbers became available a whole range of cost and efficiency selections were readily available for use, the general rule of thumb being that the greater the pressure differential the higher the removal efficiency. The cost of a variable pressure wet scrubber unit utilizing 100 horsepower would be much more attractive than a unit requiring 1,000 horsepower, both from an initial cost and an operating cost basis. The purchaser of equipment for a specific pollution control problem might find that a fabric filter or an electronic precipitator would be less attractive from an initial cost and operating cost standpoint than a wet scrubber unit of 100 horsepower, and yet more attractive cost-wise than a wet scrubber unit using 1,000 horsepower. Often the question arises, for a specific type of pollutant and concentration thereof what is the required operating pressure drop in a wet scrubber unit needed to reduce the pollutant level down to or below the emission level permitted by an applicable code or ordinance. To date no standards have been set up or universally accepted for determining the difficulty of removing various types and concentrations of pollutants in gases, and even present dry pollution-control codes and ordinances are somewhat ambiguous as to the level of pollutants permissible in gases discharged into the atmosphere. Because of these difficulties and lack of standardization, hundreds of pollution-control units around the country have been designed and installed based on poor information regarding the collection efficiency of the equipment and the relative difficulty of collecting a particular pollutant involved. In many cases the pollution control equipment has been sized and purchased with much more horsepower than is required, resulting in high initial cost and operating costs and, in other situations, wet scrubbers have been vetoed because of the erroneous impression that only a fabric filter or an electronic precipitator would do the job because of the assumed relatively high pressure drop required for a wet scrubber and the consequent high operating cost thereof. In many instances, only moderate horsepower and a relatively low pressure drop would have adequately handled the job.

One of the most frequent bad experiences has been that of installing wet scrubber equipment which is designed to operate at a lower pressure drop than was actually required to remove pollutants in a satisfactory manner down to the desired level. After such installation, at prohibitive expense, the costly equipment must be reworked until operable in a suitable manner so that code requirements are met.

The problem of selecting the size and type of pollution-control equipment and the operating parameters for the selected equipment is relatively complex and varies from industry to industry. Foundry cupola furnaces, for instance, have frequently missed the expected efficiency by large margins. As an example, a company asked for bids on equipment to reduce to suitable level the pollutant emissions from a pelletizing furnace, and several respected companies submitted bids. The proposed operating pressure drops for wet scrubbers submitted by the several companies ranged from 11 to 45 inches of water, and this typifies in a great degree the uncertainty involved. Another example is an aluminum smelting operation where a company has invested over a million dollars in pollution control equipment which has not as yet met the required efficiency needed to reduce emissions within allowable code standards, let alone reach the expected efficiency.

One attempt by manufacturers of pollution-control equipment to standardize is to issue specifications on the equipment projecting the efficiency of particle removal based on particle size. However, the problem is much more complex, and particle size is only one of a number of factors which determine the difficulty of removing a particular pollutant from a particular gas. Another problem that is sometimes overlooked is that the process itself which produces the polluted gas often changes during an operating cycle or phase, and these changes in process affect the performance of the wet scrubber or other pollutant control apparatus.

For example, the chemical analysis of emissions from the exhaust gas of a foundry cupola used for melting gray iron reveals that 20 to 30 percent of the emissions is zinc oxide, 5 percent is copper, 10 percent is lead, another 20 percent is silicon dioxide, and the remainder is iron oxide. The zinc oxide appears in greater or lesser quantities, depending upon the amount of galvanized metal that is mixed in with the scrap metal used in making up the charge. The iron oxide quantity appears to be a function of many complex factors, such as the amount of oxidation and the temperature in the melt zone. The other nonferrous materials were obviously obtained from contaminated scrap metals in the charge, and the silicon dioxide is generally thought to have been formed from a high ash content in the scrap and the silicons lost from the cupola lining itself. Accordingly, it is no small wonder that the process taking place in a cupola furnace varies considerably from hour-to-hour and day-to-day and a given pollution control system may properly remove the pollutants down to a desired level during one period of operation and yet, at another period, when the process is changed somewhat, the system may not have enough capacity to reduce the level of pollutants to an acceptable leve. In fact, in some instances, it has been found that the amount of emissions in exhaust gases of a cupola has varied in ratios as high as 10 to 1.

Another factor affecting the operating characteristics and efficiency of wet scrubbing equipment is the skill of the individual operator in controlling the process taking place in the furnace or other apparatus with which the pollution control apparatus is associated. Up until lately, particle size and distribution were thought to be the prime factors for determining the difficulty of removing various pollutants from gas by wet scrubbing. This idea no doubt originated with the dry cyclone-type centrifugal collectors where the particle sizes are normally large enough for microscopic analysis, and in such cases microscopic analysis of the specific polluting constituents could give fairly meaningful results. However, most of the air pollution problems which we are concerned with today involve pollutants containing significant portions of submicron particles and fractions, and when determining the performance of wet-type scrubbers for removing particles in this size range, information on particles is quite critical.

Investigation shows that there is no known way to determine accurately the particle size analysis of a sample containing mostly particles ranging in the submicron size. Even the definition of particle size is questionable. Sedimentation, equivalent volume, equivalent mass, equivalent diameter are all possible standards of definition. The major difficulty lies in the ability to determine whether a collected agglomerate, viewed under a microscope, was agglomerated before or after it was collected on a filter. To further compound the problem, it is well known that the efficiency of variable pressure-drop wet scrubbers is a function of more than mere particle size. The efficiency may depend on seven or eight other variables, including gas viscosity, particle shape, chemical composition, temperature, etc. Because of this, many manufacturers of wet scrubbing equipment have insisted on running pilot tests prior to quoting on pollutant control systems for specific installations.

Pilot testing is extremely expensive and because of the flexibility and advances in newer types of process equipment it may be necessary to run extensive and long tests over a period of several days or months. For example, in a foundry cupola it may be necessary to run tests coincident with several different gas blast rates and several different temperature ranges. In addition, it may be necessary to run separate tests when poor grades of scrap iron are used to point up the contrast when the better grades are used. It may be necessary to compare test results when a ductile metal is being melted as distinguished from the regular gray iron operation. Because the amount of oxidation varies from period-to-period during a melt, it may be necessary to run some 15 or 20 tests in order to get an accurate average. A good job of pilot testing thus is generally expensive and involves a substantial investment in engineering and technician time. In addition, the installation of the pilot testing equipment may involve considerable expenditures of time and money.

It is therefore an object of the present invention to provide a new and improved reliable method of determining the difficulty of removing pollutants from gases so that the standardized index can be set up which is responsive to the relative difficulty of removing various pollutants in a wet scrubbing operation. In this manner, purchasers, vendors, and engineering consultants, can accurately define and predict the magnitude or difficulty of a specific pollution control problem and can more accurately formulate specifications for the equipment necessary to do the job.

It is desirable and an object of the present invention to provide a reliable standardized index which will enable the vendors, users, and designers of pollution control equipment to specify accurately the results to be obtained in collecting a particular pollutant with the wet scrubbing equipment. The index must accurately reflect the difficulty of collecting pollutants by wet scrubbing so that a purchaser, seller, or designer of pollution control equipment has all the information necessary to determine the proper size, type, and operating characteristics of the equipment needed. In addition, a safety factor may be provided so that when changes in the process occur the equipment can handle additional loads without permitting the pollutant levels to exceed code limitations.

Another object of the present invention is to provide a new and improved method of determining the difficulty of removing pollutants from gas and setting up an index based thereon, which method and date for said index are relatively inexpensively obtained and without requiring costly and extensive complex sampling installations and equipment.

Another object of the invention is to establish a standard index which can be adopted by the industry and which is used for indicating the relative difficulty of removing pollutants from gas by wet scrubbing.

Still another object of the invention is to provide a new and improved method and apparatus for obtaining said index which method is fast and reliable and which apparatus is relatively low in cost, easy to operate, and accurate.

The foregoing and other objects and advantages of the present invention are accomplished by a new and improved method of determining the difficulty of removing pollutants from gas by wet scrubbing, including the steps of passing the sample of said gas through a standard wet scrubber stage for removing at least some of the pollutants therefrom, measuring the amount of pollutants remaining in the gas after passage through said wet scrubber stage, and adjusting the pressure drop across the wet scrubber stage to obtain a desired level of pollutants in the gas remaining after said gas has passed through said wet scrubbing stage.

Presently, most of the air pollution control ordinances and codes are written in a manner prescribing the maximum weight of pollutants emitted in pounds that is permissible per 1,000 pounds of dry gas exhausted. Other ordinances are couched in terms of pounds of pollution material emitted per pound or ton of material treated in a process. For example, in a steel making operation a pollution control ordinance might read that a maximum of X pounds of pollutant material emitted into the atmosphere per ton of steel produced. The latter type of ordinance or code is difficult to categorize and compare with other different types of processes and operations, whereas the former type of ordinance or code is more in absolute terms and does not depend on the type of process involved which produces the undesired emissions.

For a better understanding of the present invention, reference should be had to the following detailed description taken in conjunction with the drawings, in which:

FIG. 4 is a schematic diagram of another embodiment of apparatus used for determining the difficulty of removing pollutants from gas by wet scrubbing and constructed in accordance with the features of the present invention.

Figure 1:
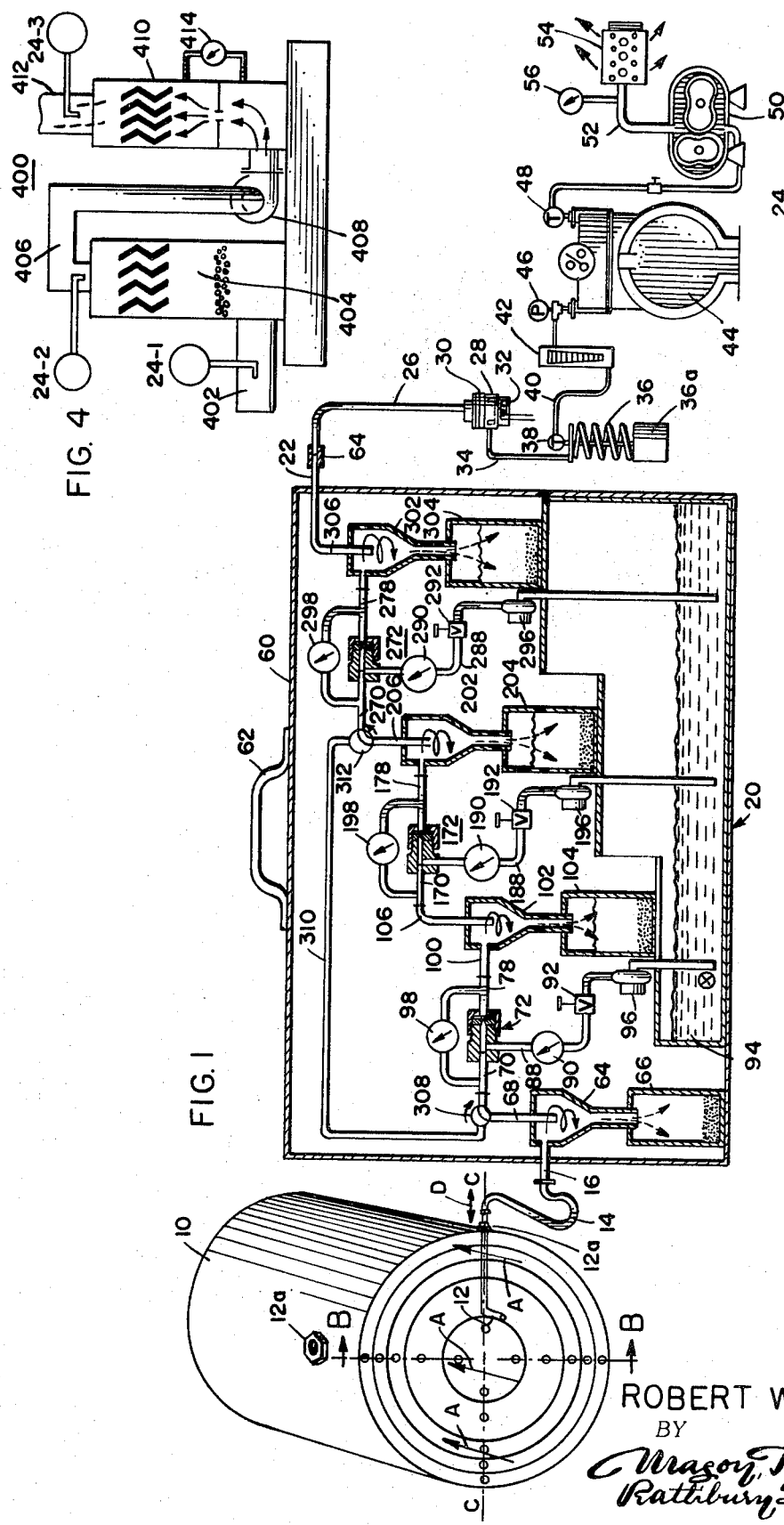
FIG. 1 shows, in schematic form, a new and improved apparatus used for determining the difficulty of removing pollutants from gas by wet scrubbing and constructed in accordance with the features of the present invention.
Figure 2:
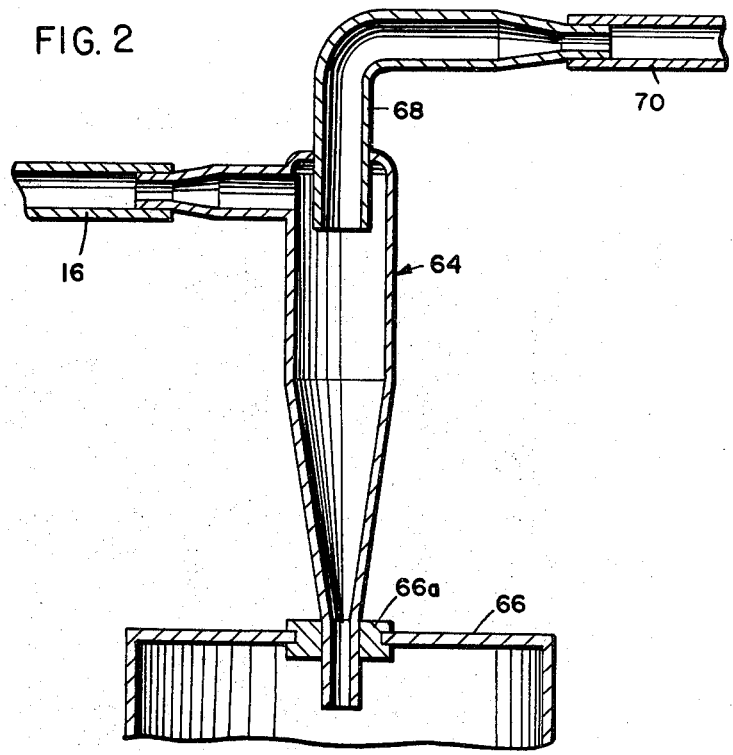
FIG. 2 is an enlarged sectional view of a centrifugal separator in the apparatus of FIG. 1.
Figure 3:
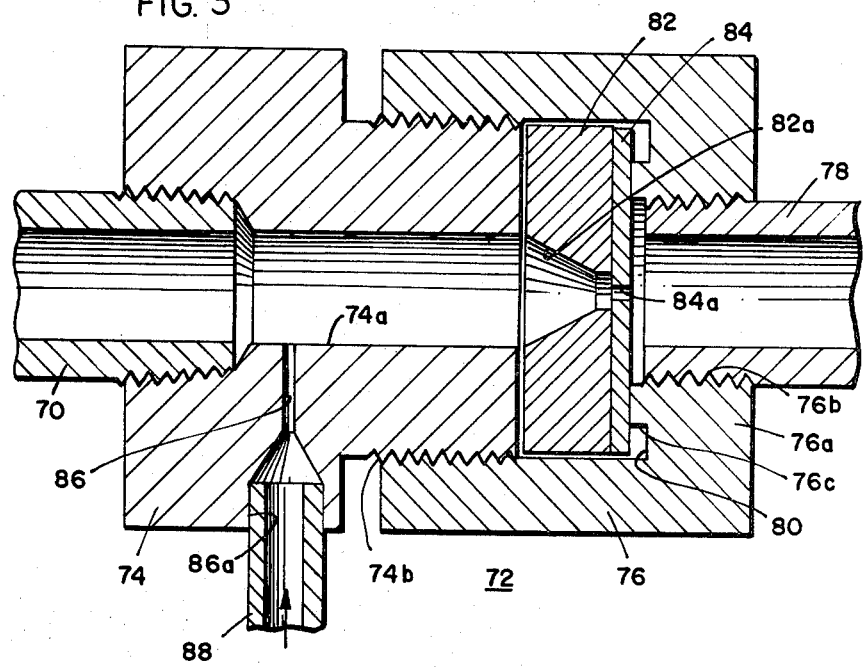
FIG. 3 is an enlarged sectional view of a flooded disc, orifice plate scrubber assembly in the apparatus of FIG. 1.

Referring now, more particularly, to the embodiment of the invention shown in FIGS. 1, 2, and 3, therein is illustrated, in schematic form, a duct 10 of circular cross section and containing a flow of contaminated exhaust gases which are to be sampled for determining the amount of pollutant material contained in the gas and the difficulty of removing the pollutants by wet scrubbing until a desired lower level of contaminants is obtained. The gases flow generally in the direction of the arrows "A" and in order to sample the gases throughout the cross section of the duct for accurately determining the amount of pollutant material present in the gas, it is desirable to obtain samples at a plurality of specific sampling points taken along a pair perpendicularly intersecting diametrical traverse lines B—B and C—C, respectively. In accordance with accepted sampling procedure and in accordance with standardized techniques used for obtaining accurate dust loading data from gas flow in ducts, as set forth in the bulletin entitled "Test Procedures for Gas Scrubbers, Wet Collectors' Division," published by the Industrial Gas Cleaning Institute, of Rye, New York, a nonprofit organization, the cross-sectional area of the circular duct is divided into a plurality of concentric, annular rings of equal area, and a sampling point (indicated by the small circles) is located at the approximate center of each ring on one of the traverse lines and in opposite directions from the traverse line perpendicular thereto. As an example, the cross-sectional area of the duct 10 is divided into five concentric rings of equal area, and a total of 20 sampling points is used, 10 on each of the traverse lines B—B and C—C.

Samples of gas are obtained through a sampling nozzle 12 which is movable along the respective traverse lines B—B and C—C between the sampling points and which can be rotated between a downstream pointing position to an upstream pointing position, as shown when it is time to take a sample of gas. The sampling nozzle 12 is slidable along the traverse line C—C, as indicated by the arrow "D," and a locknut 12a is provided to lock the nozzle in place at a sampling point. A gas sample enters into the nozzle 12 and passes through a flexible hose 14 into an inlet fitting 16 at one end of a new and improved apparatus 20 constructed in accordance with the present invention and adapted for use in determining the relative difficulty of removing pollutants from the gas by wet scrubbing action. After the sample of gas taken from the duct 10 has passed through the apparatus 20, it flows through the outlet 22 thereof into a standardized sampling train or dust concentration test system, which is indicated generally by the numeral 24. The standardized dust concentration test system is completely described in great detail in the aforementioned bulletin published by the Industrial Gas Cleaning Institute, and the procedure and data calculations are explained in detail. Briefly, however, the dust concentration test system 24 includes an inlet conduit 26 which is connected to the outlet 22 of the apparatus 20, and the conduit delivers the gas into a filter chamber 28 which contains a filter paper 30. The filter 30 is preferably a type E Gelman glass fiber filter paper and is especially designed for this purpose For all practical purposes the filter paper can be considered as an absolute filter and it is effective in removing at least 99.97 percent of all particles down to 0.3 microns in size. The filter chamber 28 is provided with an electric heater coil 32 which is supplied with electrical current to maintain the filter paper 30 in a dry condition so that accurate weighing thereof before and after a test run will accurately reflect the amount of pollutant material collected during the run and errors, because of the addition or loss of moisture, will not be present. After passage through the filter paper 30, the gas passes through a tube 34 leading from the filter chamber 28 into a condenser coil 36. A sump 36a is provided at the lower end of the coil to collect moisture in the gas, and a temperature gauge 38 is provided to measure the temperature of the dry gas leaving the condenser. The dry gas passes from the condenser via a tube 40 into a rotameter 42 and from the rotameter into the inlet side of a dry volume recording gas meter 44. The gas meter is generally similar to the meters used for measuring the volumetric flow of natural gas, and the like, into a house or factory. The temperature and pressure of the dry gas passing through the meter 44 is measured on the gauges 46 and 48. The gas sample is pulled through the test system 24 and the apparatus 20 by a constant displacement vacuum pump 50 of the Rootes-Connersville type, which is rotated at a selected speed to provide a constant volumetric flow rate. From the pump 50 the gas flows through the exhaust conduit 52 into the atmosphere through an exhaust muffler 54, and a pressure gauge 56 is provided to measure the pressure on the system.

During a timed test run, the volume flow of dry gas is obtained, the amount of water collected in the sump 36a of the condenser is measured, and the amount of pollutant or dust collected on the filter paper 30 is accurately determined by weighing before and after. The pressure and temperature gauge readings are used for converting the test results to standard conditions, and from this data a pollution or dust loading in grains per cubic foot or pounds of dry gas is calculated. The exact mathematical methods and standardized procedures for calculating the absolute dust loading of the sample gas during a timed test run are set forth in clear and precise terms in the aforementioned bulletin of the IGCI, which is incorporated herein by reference, and a further description of the procedure herein is not deemed necessary.

In accordance with the present invention, the apparatus 20 is self-contained and relatively small in size in order to be easily portable so that the apparatus can be moved conveniently from place to place wherever tests are needed. The same is true of the equipment in the sampling train 24, the components of which may be readily carried in a suitable case or enclosure not shown. The apparatus 20 (which will be referred to hereinafter as a "dust difficulty determinator" is conveniently housed in a carrying case or enclosure 60 having a suitable handle 62 thereon for easy manipulation. When making a test, the unit is set up at a position conveniently adjacent a duct 10 so that a minimum length of tubing will be required for connecting the sampling nozzle 12 to the inlet conduit 16 of the apparatus. The sampling train 24 is then set up and connected to the outlet line 22 of the dust diffculty determinator 20 by a tubular connector 64, and the test apparatus is ready for operation.

The inlet conduit 16 is connected to a centrifugal separator or cyclone unit 64 used for removing any larger sized particulate matter which may be contained in the gas sample. The lower outlet or discharge end of the cyclone 64 empties into a collection chamber 66 and the centrifuged gas leaves the cyclone upwardly through an outlet stack 68. The cyclone 64 operates as a dry centrifugal separation stage for the primary purpose of removing the larger and heavier contaminant particles so that they will not plug or clog up subsequent operating stages in the apparatus 20.

FIG. 2 is an enlarged cross-sectional view of a typical centrifugal separator or cyclone suitable for use in the first or dry cyclone stage of the apparatus; however, other types of centrifugal separators 20, identical or similar thereto, could be used. A rubber sealing grommet 66a is provided around the lower outlet of the cyclone 64 to sealingly connect the cyclone to the collection receptacle 66, as shown in FIG. 2. The centrifuged gas passing out through the discharge stack 68 of the dry cyclone 64 flows into an inlet conduit 70 of a first flooded disc-type orifice plate assembly 72, which is shown in enlarged detail in FIG. 3. The flooded disc orifice assembly 72 includes a male body portion 74 having an axial bore 74a and a projecting male portion 74b externally threaded to receive a female, nutlike body portion 76. The inlet conduit 70 is centered in coaxial alignment with the axial bore 74a of the male body member 74 and is threadedly connected into the body at the end opposite the female nut member 76. The female nut member has an enlarged axial bore with internal threads at the outer end for receiving the threaded portion 74a of the male body member 74, and its opposite end is closed by a wall 76a having a threaded bore 76b in coaxial alignment with the bore 74a of the male body member. The threaded bore 76b is adapted to receive the end of an outlet conduit 78 which connects the flooded disc-type, wet scrubber assembly 72 with a centrifuged separator or wet cyclone 102. The assembly 72 and wet cyclone 102 comprise a complete wet scrubber stage of the apparatus 20, wherein the contaminants in the gas are wetted with water, causing the particles to collect and agglomerate and the agglomerations are then removed from the remaining gas by centrifugal action.

The male and female body members 74 and 76 cooperate to form a substantially cylindrical chamber 80 in which is mounted a removable spacer disc 82 having a frustonconically tapered, convergent bore or nozzle section 82a in coaxial alignment with the axial bore 74a of the male body member 74. The frustoconical bore 82a serves as a convergent nozzle section for rapidly increasing the velocity of the gas flowing through the flooded disc orifice plate assembly 72 and directing the high velocity gas toward a small central aperture 84a formed in a removal orifice plate or disc 84, which plate is also mounted in the chamber 80 with one face adjacent the spacer disc 82. The opposite side of the disc 84 bears against an annular ridge 76c formed on the inside surface of the end wall 76a of the female body member 76. The central orifice opening 84a is centered in coaxial alignment with the axis of the main bore 74a in the male body member 74, and several orifice plates with orifice openings of different standardized diameters are provided to effect desired pressure drop ranges for the gas flowing through the respective orifice plates.

In accordance with the invention, water is used for mixing and agglomerating the contaminants and pollutants in the gas flowing through the main bore 74a of the male body member 74. The water is introduced into the gas flow by venturi action and enters through a small passage 86 which is perpendicular to the longitudinal axis of the bore 74a. Water is supplied to the passage through a conduit 88 which is connected to an enlarged lower end portion 86a of the passage 86, and a flow meter 90 is provided in the conduit 88 for giving a visual indication of the rate of water flow into the gas stream. A control valve 92 is provided in the conduit 88 for adjusting the flow rate to obtain the desired value on the meter 90. Water is supplied from a large reservoir 94 mounted in the lower portion of the case 60 and a water pump 96 is used for delivering water from the reservoir to the supply conduit 88 for introduction into the gas flow by venturi action from the passage 86.

In order to measure and determine the operating pressure drop across the flooded disc-type orifice plate 84 while the gas is flowing and water is introduced into the gas flow, a pressure gauge 98 (reading in inches of water) is connected between the inlet conduit 70 and outlet conduit 78 of the flooded disc orifice plate assembly 72. The operating pressure can be adjusted by controlling the water flow rate with the valve 92 and by using orifice plates 84 with different sized center apertures 84a therein. A specific size orifice opening 84a may be used to achieve a desired operating pressure range, and accurate final adjustment of the pressure drop to a desired value may be obtained by regulating the water flow rate with the control valve 92.

The gas flow is accelerated in the convergent bore section 82a of the spacer disc 82 and the gas velocity is increased substantially; however, the gas velocity is further increased as the gas passes through the small orifice opening 84a in a selected orifice plate 84. The water is literally torn apart by the high gas velocity into finely atomized small droplets, and an intense mixing between the gas and water droplets is achieved in the bore section 74a, disc section 82a, and orifice opening 84a. The water droplets wet and literally flood the surfaces of the disc 82 and orifice plate 84, and the contaminant and polluting materials from the gas impinge and collect in the liquid. The water droplets pick up the dust particles and other pollutants from the gas and begin to grow in size and weight. As the liquid and pollutant particles agglomerate and become heavier and larger they are removed from the gas flow, and in order to remove the agglomerated liquid and contaminant particles from the gas, the outlet conduit 78 is connected to the inlet tube 100 of a wet cyclone-type centrifugal separator 102 which is identical or similar to the cyclone 64. The cyclone 102 is provided with a sump or collection chamber 104 in communication with the lower outlet thereof for collecting the water and agglomerated pollutant material which is removed by centrifugal action. The gas outlet of the cyclone 102 is directed through an outlet conduit 106 into the inlet side of a second stage of wet scrubbing action which includes a flooded disc-type orifice plate assembly 172, similar to the assembly 72 just described. The second stage includes a centrifuged separator 202 and collector 204 and is set up to operate with a different pressure drop across the orifice plate thereof which normally will have an aperture 84a of a diameter smaller than that of the first stage.

As shown in FIG. 1, the apparatus 20 includes a total of three wet scrubbing stages in series, and components of the second stage are given reference numbers 100 higher than similar components of the first stage, while components in the third stage are given numbers 200 higher than the first stage. It is to be understood that additional wet scrubbing stages can be used if needed or only a single stage may be required. When several stages are used, each stage is set up with an operating pressure drop across its orifice plate somewhat greater than the preceding stage in order to remove the pollutants having smaller particle sizes.

In accordance with one aspect of the invention, the first wet scrubbing stage 72 may be operated at a selected and standardized pressure drop; for example, a drop of 5 inches of water across the orifice plate 84 as measured by the gauge 98. Ordinarily, the orifice plate 80 would be provided with a relatively large orifice opening 84a in order to obtain this relatively low pressure drop and only the larger particles would be removed in the first stage. The second wet scrubbing stage 172 might be operated at a somewhat higher standardized pressure drop; for example, a pressure drop of 20 inches of water, and the orifice plate 84 would have a somewhat smaller sized orifice opening 84a therein to obtain this pressure drop. The second stage would be effective to remove smaller particles than the first stage.

The final or third stage, 272, might be operated at an even greater standardized pressure drop, for example, a drop of 40 inches of water, and a small sized orifice opening 84a would be needed to obtain this high operating pressure drop. The third stage would remove even the smaller particles; for example, this stage would be effective to remove all particles down to one micron. After a timed run or test is completed with the apparatus 70 as described, the material collected from the dry cyclone 64 is weighed and analyzed and the wet material collected in the collection containers 104 204, and 304 is dried and weighed along with the material collected on the absolute filter 30 in the sampling train 24. The weight of material in the various stages is then tabulated in percentages of the whole, and the respective percentages give a good insight into the particle size composition and makeup of the pollutant material and the difficulty of removing the material by wet scrubbing action at several different operating pressures. In general, when the operating pressure drop in a flooded disc-type wet scrubber is increased, the scrubber becomes more efficient in removing smaller and smaller sized particles. The first or low pressure stage 72 would remove only a little of the fine materials while the second or intermediate stage 172 would remove some of the fines, but the final stage or high pressure stage would remove a relatively large percentage of the fine material and, for all practical purposes, the filter 30 would be effective to remove all of the remaining material contained in the gas. The percentage tabulated results generally indicate the effectiveness of wet scrubbers operated at several different pressure drops in removing the contaminants from the gas, and these percentages would provide an index indicative of the difficulty of removing and collecting the contaminants from a particular source of gas.

The percentage index, as calculated from the weight of material removed in the several stages, gives a fair idea of the microscopic analysis of the pollutant material as far as particular size is concerned and gives a general index which is indicative of the difficulty of removing the pollutant by wet scrubbing. One of the common problems in attempting to determine particle size and distribution percentages in material containing agglomerates is the fact that it is not known when the agglomeration occurred and, accordingly, only an estimate of the original condition of the particles as to size and distribution can be made. However, the apparatus 20 adds an additional dimension in that it gives an index relating to the difficulty of removing particles by wet scrubbing action in a standardized test stage of wet scrubbing. Accordingly, if it is known how a particular commercial scrubber compares operationally with the standard test stages of wet scrubbing in the apparatus 20, a more accurate prediction of operational efficiency can be obtained.

In accordance with another aspect of the present invention, the first stage 72 and the second stage 172 of wet scrubbing action may be bypassed so that the gas passes directly from the outlet stack 68 of the dry cyclone 64 to a single stage of wet scrubbing action in flooded disc orifice plate assembly 272. For this purpose, a valve member 308 is installed in the upper outlet conduit 68 of the dry cyclone 64 to connect a bypass conduit 310 with the inlet side 270 of the last flooded disc orifice plate assembly 272 through a valve member 312. When the valves 308 and 312 are rotated in the direction of the arrows shown in FIG. 1, the gas, after the heavier particles contained therein have been removed in the dry cyclone stage 64, flows up through the conduit 68, valve 308, bypass conduit 310, and valve 312 into the inlet conduit 270. After passing through the flooded disc orifice plate 82 in the assembly 272, the gas passes through the centrifugal separator 302 and out through the conduit 306 into the sampling train 24.

In using the apparatus 20 with the bypass valves 308 and 312 set to the bypass position as described, an index is obtained which relates directly to the pressure drop across the orifice plate in the orifice plate assembly 272. A sample test run using the single stage procedure will be described briefly herein. A traverse is taken across the duct 10 on the several traverse points on the traverse lines B—B and C—C, with the output from the sampling nozzle 12 connected directly to the inlet of conduit 26 of the sampling train 24. After this test run is completed, and accurate reading on the amount of pollutant material contained in the gas is calculated. By applying the applicable code standard, it is easily ascertained how much of the pollutant material must be removed by wet scrubbing action in order to reduce the exhaust level down to the permissible amount in accordance with the codes.

The test is continued and gas from the sampling nozzle 12 is directed through the apparatus 20 into the dry cyclone separator 64 and then into the single operating wet scrubbing stage in the flooded disc orifice plate assembly 272. If after a first test run operated at a selected pressure drop, the amount of pollutant collected in the absolute filter 30 of the sampling train 24 is still higher than permitted by the applicable code limits, a second run is made at a higher operating pressure drop. The change in pressure is effected by regulation of the water flow rate or by using a different orifice plate 84 with a smaller sized orifice opening 84a. Subsequent runs are conducted at higher and higher operating pressure drops, if needed, until finally the pollutant level as measured in the sampling train 24 is within the maximum level permitted in accordance with the applicable code or ordinance. When this occurs, the pressure drop, as measured by the pressure gauge 298, becomes the index number or factor which represents or indicates the relative difficulty of removing and collecting the particular contaminant involved. In other words, if a pressure drop of 45 inches of water gauge is necessary to bring the pollutant level down to an acceptable level within the applicable ordinance or code, then the index member 45 is a reliable indicator of the relative difficulty of collecting and removing the particular pollutant materials. The dust difficulty determinator index (DDD) or McIlvaine number 45 tells a purchaser, vendor, or consulting engineer that the particular gas involved requires a standard test-type wet scrubber to operate at 45 inches of water pressure drop before the pollutant material is removed down to a particular code level, which is also stated. The pollution control equipment for this particular job can then be the more accurately sized and the specific operating condition can be written on this basis.

Referring now to FIG. 4, therein is illustrated another embodiment of a new and improved apparatus for determining the difficulty of removing pollutants from industrial gases, and the like, by wet scrubbing action. This type of apparatus, generally indicated by the reference numeral 400, is suitable for more than a mere fractional or small percentage sampling-type testing and is adapted to receive a much larger proportion of the contaminated gases flowing from a process, which are received in the duct 402 to more closely simulate a pilot plant operation. The gas from the duct 402 is directed into the inlet side of a conventional low velocity, relatively constant pressure, filter bed-type wet scrubber, such as shown in U.S. Pat. Nos. 2,693,946 or 2,691,423, which employs a large filter bed formed by a plurality of spherical glass marbles. A sampling train, such as the apparatus 24 (labeled 24–1), is used to determine the amount of pollutant material contained in the untreated gas in the duct 402 during a test run. Another sampling train 24–2 is set up to check the amount of pollutant in the gas after treatment in the scrubber 404 as the gas flows in the outlet duct 406. The duct 406 is directed downwardly into the inlet or suction side of a centrifugal fan 408 which moves the partially scrubbed gas into the lower end of a variable pressure drop, orifice plate-type wet scrubber 410. A final sampling of the gas as it leaves the variable pressure drop, wet scrubber 410 is taken from the exhaust dust 412 at the sampling station 24–3 and a suitable pressure gauge 414 is provided for measuring the operating pressure drop across the orifice plate of the scrubber 410. The operating pressure drop, as indicated by the pressure gauge 414, is adjusted by changing the fan speed or orifice size, and when the desirable low level of pollutant is achieved at the sampling point 24–3, the measured pressure drop becomes the index number corresponding to the relative difficulty of collecting and removing contaminants from the particular gas being tested. As an example, the test apparatus 400 may be used in connection with a small cupola furnace installation which produces approximately 100 pounds of pollutant emissions per hour. Wet scrubbing action in the low velocity, constant pressure drop, filter bed-type scrubber 404 removes the larger contaminant particles from the gas and leaves only about 40 pounds per hour of fines present in the gas as measured at sampling point 24–2. If the applicable code permits a maximum emission of 17 pounds per hour, then the variable pressure drop, orifice plate wet scrubber 410 must be set up at an operating pressure drop which is supplied to remove an additional 23 pounds per hour of pollutant material fines. Several test runs may be required with increased pressure increments on the scrubber 410. For example, if a test indicates that when the scrubber 410 is operated at 45 inches across its orifice plate, the treated gas still contains some 20 pounds of contaminants per hour (3 pounds above the limit), still on the next test run the pressure drop may be increased up to 60 inches. If an operating pressure of 60 inches brings the emissions down to 10 pounds per hour (7 below the limit) the next test run can be set up at an operating pressure of approximately 50 inches, and this pressure should remove the contaminants down to a level in compliance with the code requirement of 17 pounds per hour. However, because the melting practices and operational temperatures of a cupola furnace may vary considerably, good engineering practice would require a safety factor, and therefore a specification for pollution control equipment in the example might be written to the effect that the pollution control equipment shall remove emissions down to a level equal to or lower than the standard wet scrubber dust difficulty determinator or McIlvaine number of 60. The index 60 would be a direct indication of the difficulty of removing the particular contaminants from the tested gas and would give vendors, purchasers, and engineers a reliable index as to the size of equipment needed and the operational characteristics and power required to produce results in compliance with the applicable codes and ordinances.

What is claimed as new and desired to be secured by Letters Patent of the United States is:

1. A method of determining the difficulty of removing pollutants from gas by wet scrubbing action including the steps of removing pollutants from the gas by passing a sample of said gas through a standard size wet scrubber stage, measuring the amount of pollutants remaining in said gas sample after passage through said wet scrubber stage, adjusting the pressure drop in said scrubber stage to obtain a desired level of pollutants remaining in said gas after passage through said wet scrubber stage, and providing said adjusted pressure drop as an index of the relative difficulty of removing said pollutants by wet scrubbing action.

2. The method of claim 1 wherein said wet scrubber stage includes the steps of wetting said gas with liquid, passing said wetted gas through a flow orifice and thereby increasing the velocity, and removing agglomerated pollutants by centrifugal action.

3. The method of claim 2 wherein said measuring step is accomplished by passing said gas through mechanical filter means and weighing the amount of pollutant collected on said filter means in a selected time period of operation.

4. The method of claim 3 wherein said pressure adjusting step is accomplished by regulating the flow rate of said liquid introduced into said gas for wetting the same.

5. The method of any claim 1 including the step of removing at least some of the larger sized pollution constituents from said gas prior to passage into said wet scrubber stage.

6. A method of determining the relative difficulty of removing pollutants from gas by wet scrubbing action including the steps of obtaining a flowing sample of gas from a source thereof, removing pollutants from the flowing sample by passing said gas through a plurality of standard sized wet scrubbers, each scrubber having a flow orifice of selected size and operated at a selected pressure different from the size and pressure, respectively, of the other wet scrubbers, adjusting the operating pressure of each scrubber to a selected level, measuring the amount of pollutant removed by each of said wet scrubbers and comparing said measured amounts of pollutants removed to provide a percentage index between the different operating pressures.

7. The method of claim 6 wherein said flowing gas sample is passed in series through said wet scrubbers and centrifugal separator means is used for collecting and removing agglomerated pollutants after each wet scrubber.

8. The method of claim 6 wherein each wet scrubber comprises a successive stage wherein said gas is first wetted and passed through a restrictive orifice plate with a selected pressure drop across said plate and finally agglomerated wetted pollutants in said gas are separated therefrom in a centrifuge and collected for measurement 9. The method of claim 6 wherein said gas is passed through a dry centrifuge for removing large pollutant particles therefrom before passing through said wet scrubbers.

10. The method of claim 6 wherein said gas is passed through a stationary porous filter medium for removing any remaining pollutants therein after passage through said wet scrubbers.

11. The method of claim 7 wherein each successive wet scrubber in said series is operated at higher gas velocity and pressure drop across said flow orifice thereof.

12. The method of claim 6 wherein scrubbing liquid is introduced into said gas by venturi action before said gas flows through the flow orifice plate of each wet scrubber.

13. The method of claim 12 wherein said scrubbing liquid is supplied to said venturi at a selectable flow rate thereby controlling the pressure drop across the flow orifice downstream thereof.

14. A method of determining an index representative of the difficulty of removing pollutants from gas by wet scrubbing action comprising the steps of removing pollutants from said gas by passing a sample of gas through a standardized wet scrubber for removing pollutants therefrom, measuring the amount of pollutants in said sample of gas both upstream and downstream of said wet scrubber, adjusting the pressure drop required across said wet scrubber to obtain a particular level of pollutants in said gas downstream of said scrubber for providing said adjusted pressure drop as an index of the difficulty of removing pollutants down to said particular level by wet scrubbing action.

15. The method of claim 14 wherein said wet scrubber includes a flooded disc orifice plate and said gas is passed through a centrifugal separator following passage through said orifice plate.

16. The method of claim 14 including the step of passing said gas through a centrifugal separator to remove some of the pollutants therefrom before passage through said wet scrubber.

17. Apparatus for determining the difficulty of removing pollutants from gas by wet scrubbing action comprising means for extracting a sample of polluted gas from a source thereof, wet scrubber means including a flooded disc orifice plate for introducing moisture into said gas during high velocity flow through said orifice plate, means for measuring and adjusting the pressure drop across said orifice plate to establish an index for the gas, centrifugal separator means for removing agglomerated pollutants from said gas after passage through said wet scrubber, and means for measuring the amount of pollutants in said gas after passage through said wet scrubber and separator 18. The apparatus of claim 17 wherein said wet scrubber means includes venturi means upstream of said orifice plate for introducing moisture into said gas, and means for regulating the flow rate of moisture to said venturi means.

19. The apparatus of claim 17 including advance centrifugal separator means for removing and collecting pollutants from said gas before passage into said wet scrubber.

20. The apparatus of claim 17 including second wet scrubber means similar to and downstream of said first mentioned wet scrubber means and including means for measuring the pressure dop across the orifice plate therein.

* * * * *